United States Patent Office 3,403,038
Patented Sept. 24, 1968

3,403,038
ASBESTOS-PHOSPHORIC ACID MOLDING
COMPOSITION
Visvaldis Abolins, Pittsfield, Mass., and Robert M. Lukes, Louisville, Ky., assignors to General Electric Company, a corporation of New York
Filed Jan. 12, 1966, Ser. No. 520,259
2 Claims. (Cl. 106—63)

ABSTRACT OF THE DISCLOSURE

Preparation of a thermosetting molding composition by first gently mixing phosphoric acid with diatomaceous earth material to provide a dry, free-flowing acid containing powder, and then gently dry blending this powder with asbestos fibers.

Figure 1:
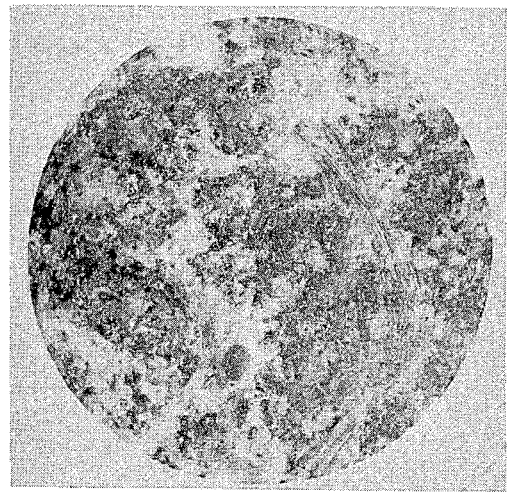

This invention relates to an asbestos-phosphoric acid molding composition and more particularly to a molding composition of this type having a very greatly extended working life at room temperature.

Molding compositions comprising chrysotile asbestos fibers and orthophosphoric acid of greater than 60% concentration are taught in U.S. Patent 2,336,485, Brink et al. Molded articles produced from asbestos-phosphoric acid molding compositions, such as those taught by Brink et al., are mechanically strong, hard, dense and rigid. These compositions have been used extensively for the hot-molding of arc chutes for air circuit breakers and other high temperature applications.

Among the advantages of asbestos-phosphoric acid molding material are that shrinkage of the material during the hot-molding process is minimized and that the surface of these moldings, while they may be readily machined, have a good finish obviating any need for a further finishing or polishing operation.

The spontaneous and highly exothermic reaction, which occurs when asbestos and phosphoric acid are mixed, is a well-known drawback to the prior art asbestos-phosphoric acid molding compositions and for all practical purposes, these compositions must be extensively cooled during mixing and storing to delay this spontaneous reaction. In the past this has been accomplished by mixing in the presence of Dry Ice or in a water-cooled mixing apparatus. For example, in a typical prior art mixture, three pounds of Dry Ice were used for every three pounds of asbestos in the mixture. In addition, in order to extend the life of the composition, refrigeration was required after mixing. In the absence of some cooling means, these compositions must be molded within a matter of minutes after mixing.

One object of the present invention is to provide an asbestos-phosphoric acid molding composition having an extended storage life at room temperature.

Another object of this invention is to provide an asbestos-phosphoric acid molding composition which need not be extensively cooled prior to being molded.

A further object of this invention is to provide a stable asbestos-phosphoric acid molding composition from which arc chutes for air circuit breakers and products especially useful for other high temperature applications may be molded.

Briefly stated, in accordance with one aspect of this invention a new and improved molding composition having a very greatly extended working life at room temperature is provided. The composition comprises a dry free-flowing mixture of phosphoric acid and a solid absorbent material which absorbent material is unreactive with phosphoric acid at room temperature. Asbestos fibers are thereafter dry blended with the dry phosphoric acid-absorbent mixture. The resulting dry molding composition is essentially unreactive at room temperature yet may be readily molded to form mechanically strong, hard, dense, rigid thermoset products especially useful for high temperature applications or environments.

Although silaceous materials, similar to diatomaceous earth materials, have been used as fillers in molding compositions in the past, the fact that a composition of the asbestos-phosphoric acid type, may be rendered nonreactive by first mixing one of the components with a solid absorbent material, such as a diatomaceous earth material, has not been suggested in the prior art and was completely unexpected.

Figure 2:
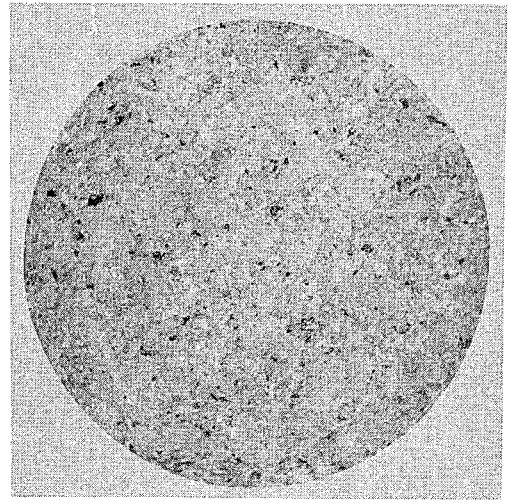

While the specification concludes with claims particularly pointing out and distinctly claiming the subject matter of the present invention, the invention may be better understood by reference to the following detailed description and the attached illustration in which:

FIGURE 1 is a photomicrograph of the crystalline structure of a molded article made from a prior art molding composition, and FIGURE 2 is a photomicrograph of the crystalline structure of a molded article made from the molding compositions of the present invention.

In preparing the new and improved molding composition of this invention we first mix a phosphoric acid solution with a solid absorbent material to provide a dry, free-flowing acid-containing powder. For purposes of this invention the solid absorbent material must be chemically unreactive with phosphoric acid at room temperature as well as being capable of retaining the physical characteristics of a dry, free-flowing powder when admixed with at least 50 weight percent of phosphoric acid.

To the dry, free-flowing phosphoric acid-containing powder so provided we then dry blend asbestos fibers, preferably chrysotile asbestos fibers, to provide the molding composition of this invention. Wholly unexpectedly, the molding composition so provided is found to be essentially unreactive at room temperature yet readily moldable to provide a desired thermoset product. Conveniently, the product may be molded employing both heat and pressure although satisfactory products have been produced employing pressure alone with the phosphoric acid-asbestos reaction going to completion at room temperature.

Preferably, the solid absorbent material is a diatomaceous earth material. Diatomaceous earth, also known as infusorial earth, is a well known silaceous material composed of the skeletal remains of small aquatic plants called diatoms. Although satisfactory dry, free-flowing acid-containing powders may be obtained from a mixture of phosphoric acid and such "natural" or "untreated" diatomaceous earth material, improved results are attained by the use of diatomaceous earth which has been suitably treated or processed such as, for example, by being calcined or subjected to a hydrothermal reaction to produce synthetic silicates. The term "diatomaceous earth," therefore, is used herein in a broad sense and is intended to include the so called "natural," calcined or otherwise treated or processed diatomaceous earth materials. For example, especially satisfactory results have been obtained with the processed or so called "synthetic silicates" of a type which are produced by the hydrothermal reaction of diatomaceous earth with an alkaline earth metal hydroxide. Synthetic calcium and magnesium silicates of this type are sold commercially by the Johns-Manville Company under the trademarks Micro-Cell and Celkate respectively; "natural" and calcined diatomaceous earth being sold under the trademark Celite. Especially satisfactory results have been obtained with one of the foregoing synthetic calcium silicates produced by the hydrothermal reaction of diatomaceous earth with lime and designated Micro-Cel-E. This particular material was found to absorb a concentrated phosphoric acid solution (75% acid-water solution) to the extent of four times the weight of the absorbent material and still retain the physical characteristics of a dry, free-flowing powder which was essentially chemically unreactive at room temperature with the asbestos fibers dry blended therewith.

Chrysotile asbestos is preferred and a mixture of short and long fiber crylsotile asbestos is commonly used. The proportion of asbestos to phosphoric acid is not critical, although asbestos-phosphoric acid molding compositions usually comprise about 1 to 3 parts by weight of asbestos per part phosphoric acid.

The exact nature of the mechanism involved in the present invention is not entirely understood and may be one of *absorption* or *adsorption*, or a combination thereof. To simplify the description of the invention, therefore, the terms "absorption" and "solid absorbent material" have been employed with the intention that they be given an interpretation consistent with the actual mechanism or combination of mechanisms involved in any given composition.

In mixing the asbestos wtih the dry mixture of phosphoric acid and solid absorbent and also in blending the phosphoric acid solution with the solid absorbent material, severe agitation should be avoided since the structure of the absorbent material seems to break down under excessive stress. The tendency of the structure of the solid absorbent to breakdown may be aggravated by the slightly exothermic reaction by which the acid is absorbed or otherwise contained in the solid absorbent material. These materials should therefore not be blended too rapidly and preferably the phosphoric acid is added in small quantities to the solid absorbent material while the mixture is blended or agitated gently.

The nonreactive, phosphoric acid-asbestos composition so produced may be rendered reactive by the application of heat and pressure, or by pressure alone. In a hot molding process, these dry compositions are thus activated and made at least somewhat flowable as they are molded and these factors facilitate the use of the nonreactive compositions of the present invention as extremely desirable molding materials.

For example, the physical properties as well as the crystalline structure of the articles molded from the compositions of this invention were found to be significantly better than those of articles molded from the prior art type; short working life asbestos-phosphoric acid type compositions, such as that of the Brink et al. patent, for example.

As an illustration of the manufacture and use of the molding composition of the present invention, the following example is given:

One hundred grams of Micro-Cel-E was mixed with 400 grams of 75% aqueous phosphoric acid. The acid was added in small portions to the Micro-Cel-E, slowly stirring the mix. The glass beaker containing the mix was cooled externally in tap water during the mixing operation which lasted approximately 5 minutes. The cooling was continued for 5 to 10 minutes after the mixing was completed to bring the temperature of the mix to room temperature. The resultant mixture was a dry powder, light brown in color. Two hundred and thirty-three grams of this mixture was mixed with 300 grams of mixed long and shoft fiber chrysotile asbestos. These components were blended for three minutes in a mixer operating at slow speed. A dry, soft, light sand-colored molding composition was attained. Two hundred and forty grams of this composition was placed in a cavity of a compression type mold for an arc chute side. The mold was preheated to approximately 145° C. and the mold was closed, with the application of a 30-ton force. The heat and pressure were applied for 15 minutes and when removed from the mold the resulting arc chute side was hard, well-filled and uniform.

As another example of the molding composition of the present invention 727.2 grams of a 75% aqueous phosphoric acid solution was blended with 181.8 grams of Micro-Cel-E. A laboratory blender, having some of the blades removed, was used to minimize shearing action on the mixture. Other precautions were taken to avoid heat buildup during the mixing process. The absorbed phosphoric acid was then combined with 1091 grams of premixed long and short fiber chrysotile asbestos. After mixing these materials for 10 minutes, several articles were molded using a steam-heated 50-ton hydraulic press to produce molded articles having many desirable qualities. Moldings produced from the same composition that had been stored for 2 and 4 hours at room temperature, respectively, were found to be similar to those that had been molded immediately after the compound had been mixed. Articles molded from the foregoing composition in an unheated mold with increased pressure were also found to possess the same desirable equalities.

The proportions of the above described molding composition mixture are not critical. The molding composition mixture may contain from 20 to 70 percent by weight of asbestos fibers and 30 to 80 percent by weight of dry, free-flowing acid containing powder. The powder may contain from 50 to 80 percent by weight of phosphoric acid and 20 to 50 percent by weight of diatomaceous earth material.

The room temperature storability of the molding composition taught in the present invention may be best illustrated by reference to still another example in which 120 grams of 75% aqueous phosphoric acid was blended with 30 grams of Micro-Cel-E to form a dry, powdery material. This material was blended with 192 grams of mixed long and short fiber chrysotile asbestos and portions of the mixture were molded at 300° F. and 4000 pounds per square inch pressure, at various intervals up to four days after mixing. The flexural strength, impact resistance relative to a common standard, and average hardness, at the middle and at the ends of the molded article both in the direction of and perpendicular to the molding force direction, may be seen in Table I for the molded articles produced at these various time intervals.

TABLE I

| Time | Flexural strength (p.s.i.) | Impact resistance (relative) | Hardness-molding force direction | | Hardness-cross molding force | |
|---|---|---|---|---|---|---|
| | | | Middle (average) | Ends (average) | Middle (average) | Ends (average) |
| 0 | 3,568 | 4.2-6.2 | 55 | 54 | 54 | 50 |
| 1 hour | 4,048 | 3.3-6.6 | 53 | 54 | 54 | 51 |
| 3 hours | 4,409 | 5.4-12.0 | 56 | 55 | 55 | 56 |
| 4 hours | 4,359 | 4.1-11.4 | 55 | 54 | 56 | 46 |
| 5 hours | 4,308 | 5.7-10.6 | 55 | 53 | 51 | 54 |
| 6 hours | 3,766 | 5.5-9.5 | 51 | 52 | 56 | 50 |
| 4 days | 3,926 | 2.1-8.9 | 58 | 51 | 38 | 25 |

Accordingly, the foregoing has shown that there has been provided a hot-molding composition, of the asbestos-phosphoric acid type, having a very long storage life at room temperature. This is in contrast to the compositions of the prior art which require either extensive cooling or immediate use after mixing. In addition, improvements are noted in the crystalline structure of molded articles produced from compositions produced according to the present invention, and in the physical properties of these articles as compared to those produced by known methods. This may be seen, for example, in FIGURES 1 and 2, which are photomicrographs of the crystalline structure of hot-molded articles using the molding composition of the prior art and that of the present invention, respectively. FIGURE 1 shows the crystalline structure of a molded article produced from chrysotile asbestos and liquid aqueous phosphoric acid solution. The white masses in this figure are free asbestos fibers which can be seen throughout the structure. A general nonhomogeneous distribution of components is also apparent. This is in contrast to the crystalline structure, shown in FIGURE 2, of molded articles produced from the molding composition of the present invention. The crystalline structure of this article is characterized by homogeneity and practically a total absence of free asbestos fibers.

While the present invention has been described with reference to particular embodiments thereof, it will be understood that numerous modifications may be made by those skilled in the art without departing from the true spirit and scope of the invention. Therefore, the appended claims are intended to cover all such equivalent variations which come within the true spirit and scope of the present invention.

What is claimed as new and desired to be secured by Letters Patent of the United States is:

1. A method of preparing an inorganic thermosetting molding composition comprising:
   (a) gently mixing from about 50 to 80 percent by weight of ortho-phosphoric acid and from about 20 to 50 percent by weight of diatomaceous earth to provide a dry, free-flowing acid containing powder; and
   (b) gently dry blending 20 to 70 percent by weight of chrysotile asbestos fibers with 30 to 80 percent by weight of said dry, free-flowing acid containing powder.

2. A method of preparing an inorganic thermosetting molding composition comprising:
   (a) gently mixing four parts by weight of orthophosphoric acid and one part by weight of a calcium silicate produced by a hydrothermal reaction of diatomaceous earth with an alkaline earth metal hydroxide to provide a dry, free-flowing acid containing powder; and
   (b) gently dry blending 50 to 60 percent by weight of chrysotile asbestos fibers with 40 to 50 percent by weight of said dry free-flowing acid containing powder.

References Cited

UNITED STATES PATENTS

| | | | |
|---|---|---|---|
| 1,435,416 | 11/1922 | Ottman | 106—63 |
| 2,687,967 | 8/1954 | Yedlick et al. | 106—63 |

JAMES E. POER, *Primary Examiner.*